United States Patent
Yabushita et al.

[11] Patent Number: 6,024,346
[45] Date of Patent: Feb. 15, 2000

[54] COIL SPRING RESISTANT TO PERMANENT SET AND FATIGUE

[75] Inventors: Takeshi Yabushita; Noritoshi Takamura; Mitsutoshi Kaneyasu; Michihiko Ayada, all of Yokohama, Japan

[73] Assignee: NHK Spring Co., Ltd., Japan

[21] Appl. No.: 09/017,396

[22] Filed: Feb. 2, 1998

[51] Int. Cl.[7] .................................. F16F 1/06; C23C 8/22
[52] U.S. Cl. .......................... 267/166; 267/180; 148/226
[58] Field of Search ..................................... 267/166–180; 148/226, 230, 580, 908

[56] References Cited

U.S. PATENT DOCUMENTS 5,665,179  9/1997  Izawa et al. .......................... 148/226
5,683,521  11/1997  Matsumoto et al. .................... 148/226

FOREIGN PATENT DOCUMENTS 176430    7/1983   Japan .
177152    8/1987   Japan .
156351    6/1993   Japan .
9-112614  5/1997   Japan .

Primary Examiner—Chris Schwartz
Attorney, Agent, or Firm—Marger Johnson & McCollom, P.C.

[57] ABSTRACT

By controlling the thickness of the nitrization layer formed on the surface, the coil spring made of spring steel may be made highly resistant to permanent set and fatigue. By carbonitriding the material of the coil spring to a depth of 20 to 50 $\mu$m from the surface thereof so as to have an internal hardness of Hv 540 or higher, the coil spring can be made to endure $10^7$ cycles of repeated high stress without suffering any significant permanent set.

2 Claims, 3 Drawing Sheets surface roughness profile steepness $= \dfrac{h}{a}$ nitrization layer thickness (μm)

COIL SPRING RESISTANT TO PERMANENT SET AND FATIGUE

TECHNICAL FIELD

The present invention relates to a coil spring which is highly resistant to permanent set and fatigue which is useful in applications where repeated stress is applied. Such applications include engine valve springs and wheel suspension systems among other possibilities.

BACKGROUND OF THE INVENTION

With the advance in the reduction in the vehicle weight and the increase in the output of the vehicle engine, the coil springs used for wheel suspension systems and the valve springs used in internal combustion engines have come to be required to be able to withstand increasingly higher stresses, and, in particular, such springs are desired to be resistant to permanent set and fatigue.

Breakage of a coil spring due to fatigue typically occurs through the generation and propagation of cracks which typically start from defects such as inclusions on the surface or in the interior of the material of the coil spring. However, with the progress in the steel making technology, the occurrence of fatigue breakage due to inclusion of foreign matters in the material has become very rare. As a measure to further enhance the fatigue strength of coil springs, it has been proposed to carbonitride and strengthen the material surface. In particular, it has been proposed to achieve a nitriding depth of 70 µm or more so that a high compressive residual stress may be produced on the surface (refer to Japanese patent laid open publications (kokai) Nos. 7-11422, and 5-156351).

However, a carbonitrization process of a relatively long time duration is required to achieve a nitriding depth of 70 µm or more, and, therefore, even though the fatigue strength may be improved, the hardness of the interior of the material may be reduced so that the resistance of the material to permanent set could be impaired. This will be the case particularly when the load stress is high, and the material could lose its load bearing capability in use.

It is also known to set the upper limit of the surface roughness of the material so that the notch sensitivity may not impair the resistance of the material to permanent set (refer to Japanese patent laid open publication (kokai) No. 7-11422). The notch sensitivity tends to increase with the increase in the steepness of the irregularities or the surface roughness, and such an increase in the notch sensitivity leads to the reduction in the service life of the spring material.

BRIEF SUMMARY OF THE INVENTION

In view of such problems of the prior art, a primary object of the present invention is to provide a coil spring which is highly resistant to permanent set even when it is subjected to a high load stress.

A second object of the present invention is to provide a coil spring which has a high fatigue strength.

A third object of the present invention is to provide a coil spring which has favorable mechanical properties, and can be manufactured economically.

According to the present invention, these and other objects can be accomplished by providing a coil spring made of spring steel which is resistant to permanent set and fatigue, characterized by that: the material of the coil spring is carbonitrided to a depth of 20 to 50 µm from a surface thereof so as to have an internal hardness of Hv 540 or higher. Preferably, the coil spring has a surface roughness Rmax which is 15 µm or less, and a surface roughness steepness of 0.02 or less.

The fatigue life of a coil spring can be improved by hardening the surface of the coil spring by nitrization and producing a compressive residual stress on the surface after the coil is formed. Normally, the deeper the nitrization layer is, the greater is the increase of the compressive residual stress produced on the surface. However, as the thickness of the nitrization layer is increased, the internal hardness diminishes (FIG. 5), and this could lead to the occurrence of a permanent set. As a result, when the spring is subjected to a high load, the spring may not be able to produce the required spring load. Also, if the nitrization layer thickness is too small or no nitrization layer is formed, the fatigue life may reduce.

Shot peening is normally used for producing a compressive residual stress on the surface, but the sharp edges of broken shots may increase the steepness in the surface roughness of the spring, and this may undesirably increase the notch sensitivity of the material. In such a case, even when the nitrization layer thickness is appropriate, the fatigue life may be impaired.

BRIEF DESCRIPTION OF THE DRAWINGS

Now the present invention is described in the following with reference to the appended drawings, in which.

DETAILED DESCRIPTION OF THE PREFERRED EMBODIMENTS

The coil spring according to the present invention may be made from spring steel. The depth of the nitrization layer is 20 to 50 µm, and the internal hardness is Hv 540 or more. The surface roughness Rmax is 15 µm or less, and the steepness in the surface roughness is 0.02 or less. The coil spring may be manufactured as described in the following.

Figure 1:
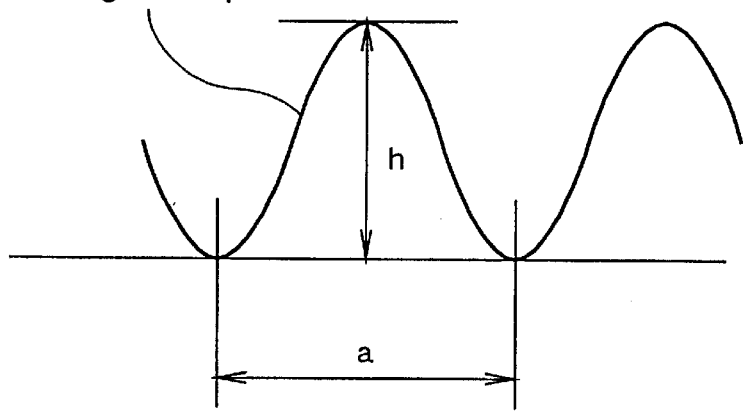
FIG. 1 is a diagram showing the definition of the steepness of surface roughness.

Spring steel wire is coiled in a conventional manner, and is subjected to a carbonitriding process to achieve a nitrization layer thickness of 20 to 50 µm. A shot peening process is carried out in such a manner that a high level of compressive residual stress may be achieved on the surface, and extend relatively deep inside the material. The steepness of the surface roughness profile is controlled to be 0.02 or less as shown in FIG. 1. This can be accomplished by using a two-stage shot peening process comprising the first step of conducting a normal shot peening using shots having a higher hardness than the subject material, and the step of conducting a roughness improving shot peening using shots having similar hardness as the subject material. The roughness improving shot peening may be repeated a number of times, for instance progressively reducing the size of the shots from one session to the next. The method is by no means limited to shot peening, but a steepness of a similar level may be achieved also by using other methods, such as shot-blasting and honing.

The nitriding of the surface of the subject material can be favorably accomplished by using the low temperature gas carbonitriding which would not raise the temperature any higher than approximately 480° C. and allows the process to be completed in a relatively short period of time. For more detail of this process, reference should be made to Japanese patent laid open publications (kokai) Nos. 62-177152, 63-176430 and 05-331535. In this case, the desired carbonitriding process can be favorably carried out over the temperature range of 380 to 480° C. for 0.5 to 4 hours, and more preferably over the temperature range of 400 to 450° C. for 0.5 to 2 hours. The low carbonitriding temperature and the short time duration allow the hardness of the subject material from being impaired by the carbonitriding process.

Figure 2:
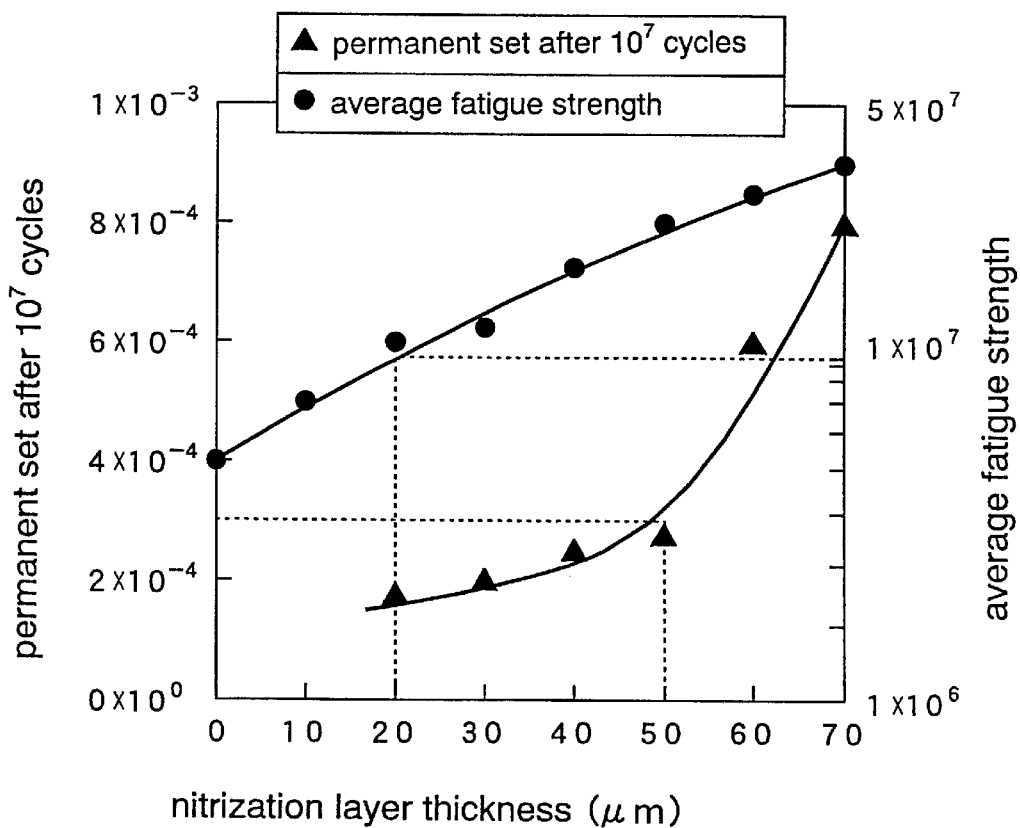
FIG. 2 is a graph relating the fatigue strength and the permanent set after $10^7$ cycles of test stress of $\tau=70\pm65$ kgf/mm$^2$ to the nitrization layer thickness.
Figure 3:
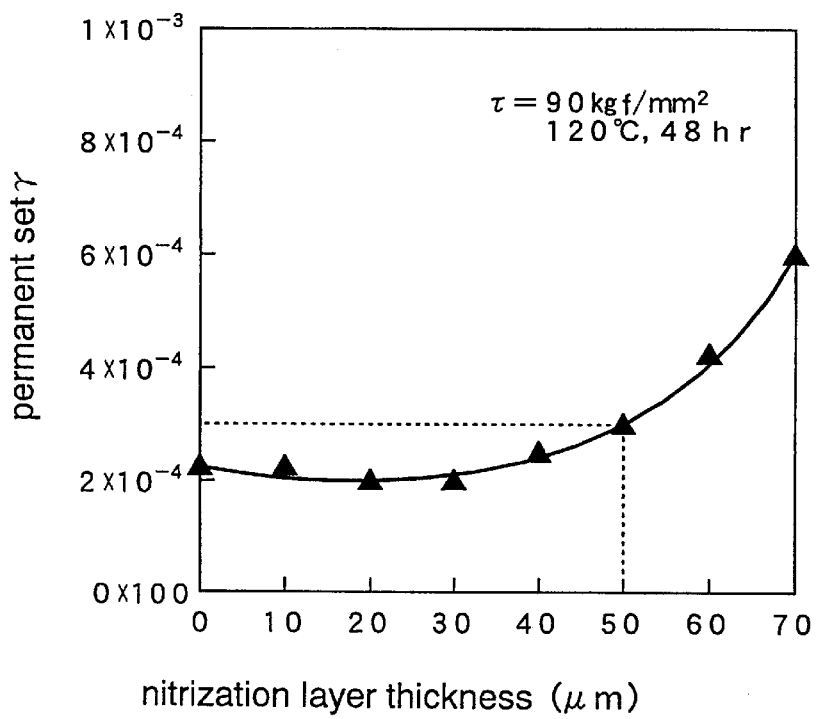
FIG. 3 is a graph relating the permanent set after a 48 hour clamping at 120° C. with a test stress of 90 kgf/mm$^2$ to the nitrization layer thickness.
Figure 4:
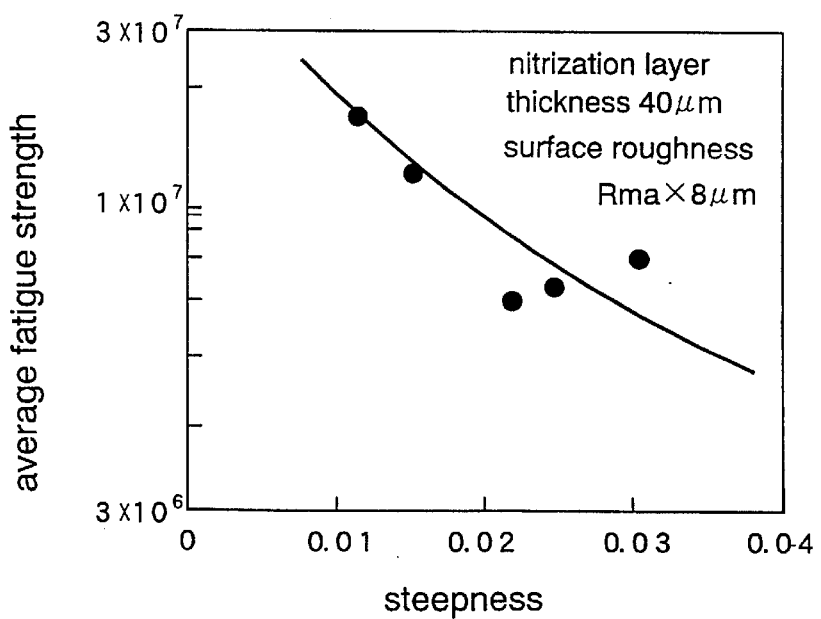
FIG. 4 is a graph relating the fatigue strength to the steepness of surface roughness for the test stress of $\tau=70\pm65$ kgf/mm$^2$ when the surface roughness Rmax is 8 µm, and the nitrization layer thickness is 40 µm.
Figure 6:
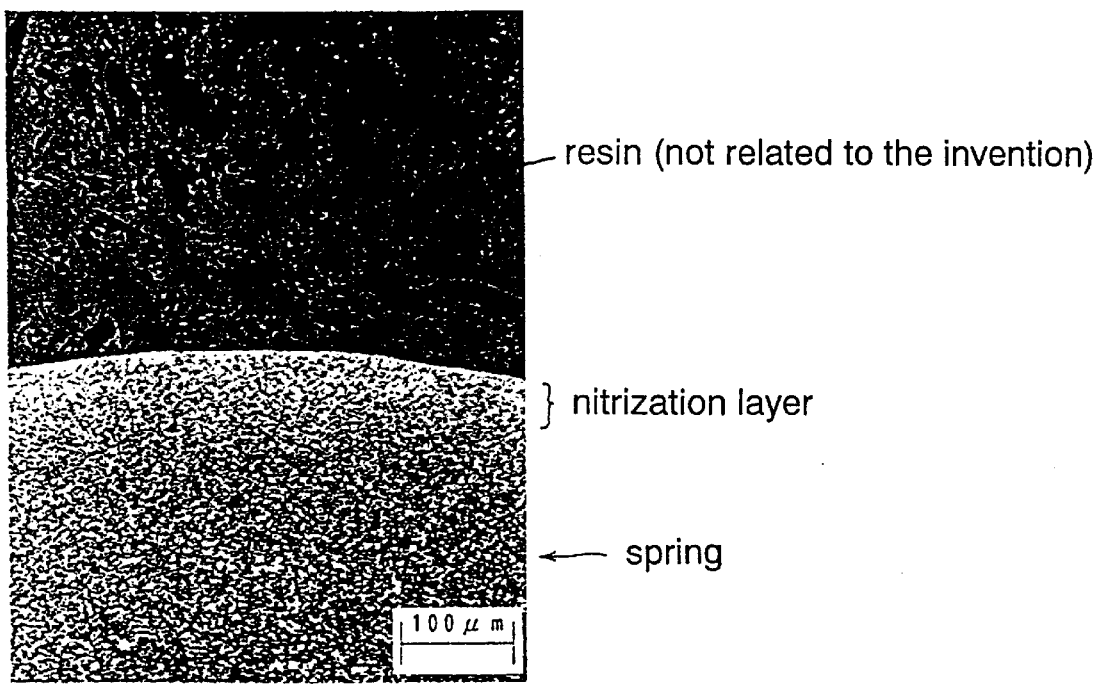
FIG. 6 is a microscopic photograph showing the cross section of the coil spring according to the present invention.

FIG. 6 is a microscopic photograph of a cross section of a coil spring made in this fashion, and the nitrization layer extends approximately 40 $\mu$m in depth. This coil spring was subjected to a fatigue test with a test stress level of $\tau=70\pm65$ kgf/mm$^2$, and a permanent set was measured after $10^7$ cycles of the test load (FIG. 2). To test the resistance to permanent set, a 48-hour clamping test was carried out with a test stress level of $\tau=90$ kgf/mm$^2$ at 120° C. For comparison, coil springs with nitrization layer thicknesses of 0.10 $\mu$m and 60 $\mu$m were made, and subjected to similar tests (FIG. 3). Additionally, a coil spring with a nitrization layer thickness of 40 $\mu$m and a relatively steep surface roughness was prepared, and was subjected to a fatigue test with a test stress level of $\tau=70\pm65$ kgf/mm$^2$ (FIG. 4).

Figure 5:
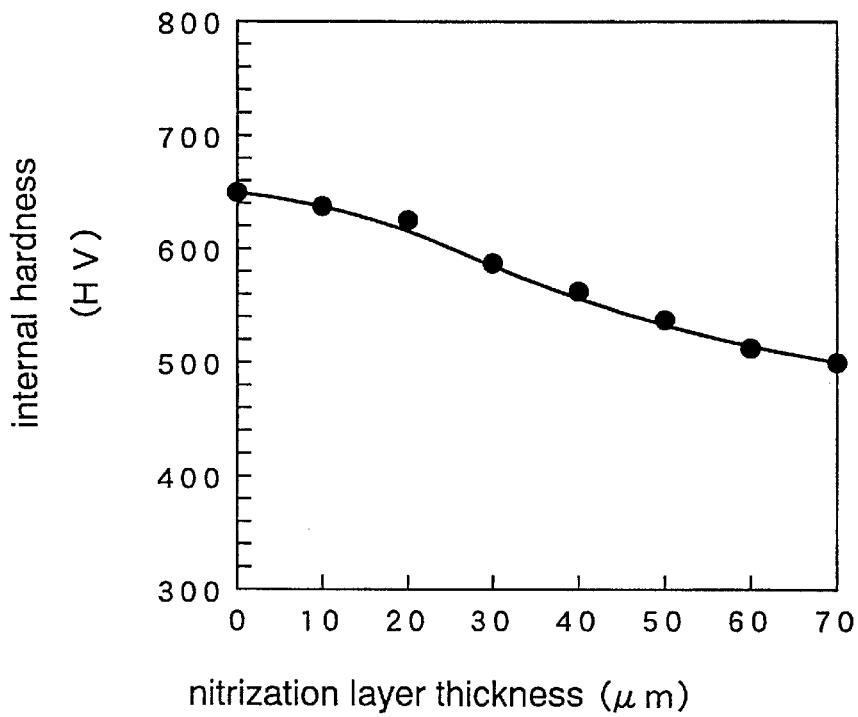
FIG. 5 is a graph relating the internal hardness and the depth in the nitrization layer.

As can be appreciated from FIG. 2, the average number of stress cycles before rupture was less than $10^7$ cycles when the nitrization layer thickness was 10 $\mu$m, but more significant improvements were made when the nitrization layer thickness was in the range of 20 to 70 $\mu$m. The permanent set ($\gamma$: residual shear strain) after $10^7$ cycles of test load was at an acceptable level of $3\times10^{-4}$ or less when the nitrization layer thickness was in the range of 20 to 50 $\mu$m, but increased to an unacceptable level of $6\times10^{-4}$ or more when the nitrization layer thickness was 60 $\mu$m or more. From FIG. 5 which shows the distribution of hardness over the depth of the material when the limit of permanent set is selected at $3\times10^{-4}$, it can be seen that the internal hardness of the material is required to be Hv 540 or more for the nitrization layer thickness to be 50 $\mu$m or less.

According to the result of the clamping test summarized in FIG. 3, the permanent set was $3\times10^{-4}$ or less when the nitrization layer thickness was 50 $\mu$m or less, but was $4.5\times10^{-4}$ or more when the nitrization layer thickness was 60 $\mu$m or more.

According to the test results in which the nitrization thickness was 40 $\mu$m, the surface roughness Rmax was in the order of 8 $\mu$m, and the steepness was changed, it was found that the steepness affects the fatigue life of the material, but an acceptable fatigue life of $10^7$ cycles can be achieved if the steepness is 0.02 or less.

Although the present invention has been described in terms of preferred embodiments thereof, it is obvious to a person skilled in the art that various alterations and modifications are possible without departing from the scope of the present invention which is set forth in the appended claims.

What we claim is:

1. A coil spring made of spring steel which is resistant to permanent set and fatigue, characterized by that:

the material of said coil spring is carbonitrided to a depth of 20 to 50 $\mu$m from a surface thereof so as to have an internal hardness of Hv 540 or higher.

2. A coil spring according to claim 1, wherein said coil spring has a surface roughness Rmax which is 15 $\mu$m or less, and a surface roughness steepness of 0.02 or less.

* * * * *